United States Patent
Yamanaka et al.

[11] Patent Number: 6,005,905
[45] Date of Patent: *Dec. 21, 1999

[54] INITIAL CORE

[75] Inventors: Akihiro Yamanaka, Hitachi; Katsumasa Haikawa, Jyuou-machi; Akiko Kanda, Hitachi; Takaaki Mochida, Hitachi; Junichi Yamashita, Hitachi; Motoo Aoyama, Mito; Yoko Yuchi; Junichi Koyama, both of Hitachi, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/664,663

[22] Filed: Jun. 17, 1996

[30] Foreign Application Priority Data

Jun. 30, 1995 [JP] Japan .................................. 7-165137

[51] Int. Cl.$^6$ .................................................. G21C 19/00
[52] U.S. Cl. ........................... 376/267; 376/419; 376/435; 376/349
[58] Field of Search ..................................... 376/419, 435, 376/349, 267

[56] References Cited

U.S. PATENT DOCUMENTS

| | | | |
|---|---|---|---|
| 3,844,886 | 10/1974 | Crowther | 376/435 |
| 3,986,924 | 10/1976 | Motoda | 376/267 |
| 4,244,784 | 1/1981 | Takeda et al. | 376/435 |
| 4,285,769 | 8/1981 | Specker et al. | 376/435 |
| 4,587,090 | 5/1986 | Mochida et al. | 376/435 |
| 4,914,678 | 4/1990 | Koyama et al. | 376/435 |
| 5,192,496 | 3/1993 | Soneda et al. | 376/435 |
| 5,249,211 | 9/1993 | Nagano et al. | 376/435 |
| 5,367,547 | 11/1994 | Hida et al. | 376/435 |
| 5,388,132 | 2/1995 | Aoyama et al. | 376/435 |
| 5,544,211 | 8/1996 | Haikawa et al. | 376/435 |

FOREIGN PATENT DOCUMENTS

| | | | |
|---|---|---|---|
| 60-13283 | 1/1983 | Japan | 376/267 |
| 0171494 | 9/1985 | Japan | 376/267 |

Primary Examiner—Harvey E. Behrend
Attorney, Agent, or Firm—Antonelli, Terry, Stout & Kraus, LLP

[57] ABSTRACT

In an arrangement of an initial core, the core is loaded with 572 high enrichment fuel assemblies H with 4.2 wt % average enrichment and 300 low enrichment fuel assemblies L with 1.5 wt % average enrichment. The average enrichment of the core is about 3.3 wt %. In this core, only the low enrichment fuel assemblies are loaded into the most outer position of the core and the high enrichment fuel assemblies are loaded into an area other than the most outer position. In this arrangement, the average enrichment of reload fuel assemblies is 3.7 wt %.

7 Claims, 8 Drawing Sheets

FIG. 1
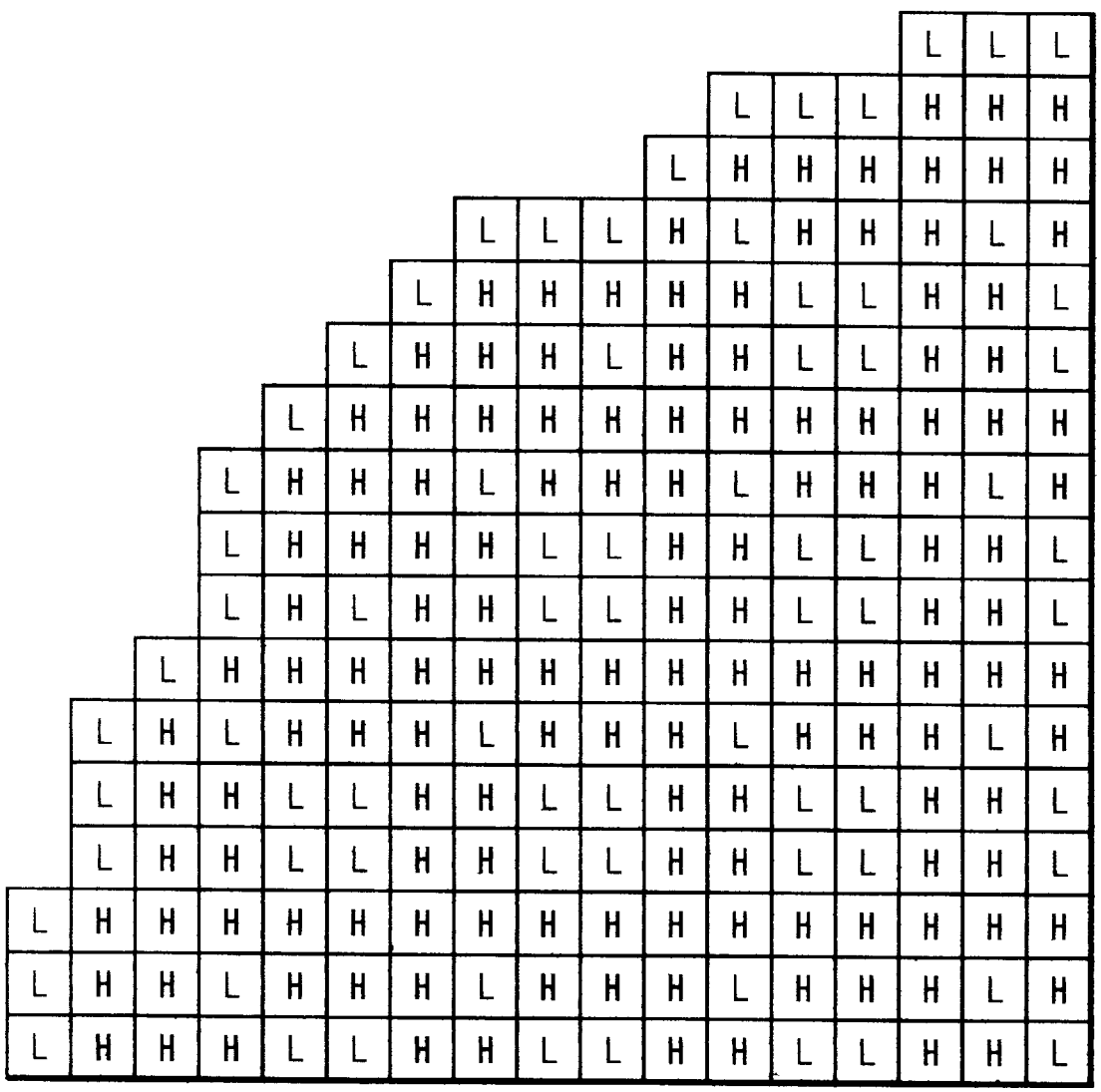
 LOW ENRICHMENT FUEL : 300 ASSEMBLIES
 HIGH ENRICHMENT FUEL : 572 ASSEMBLIES

FIG. 10
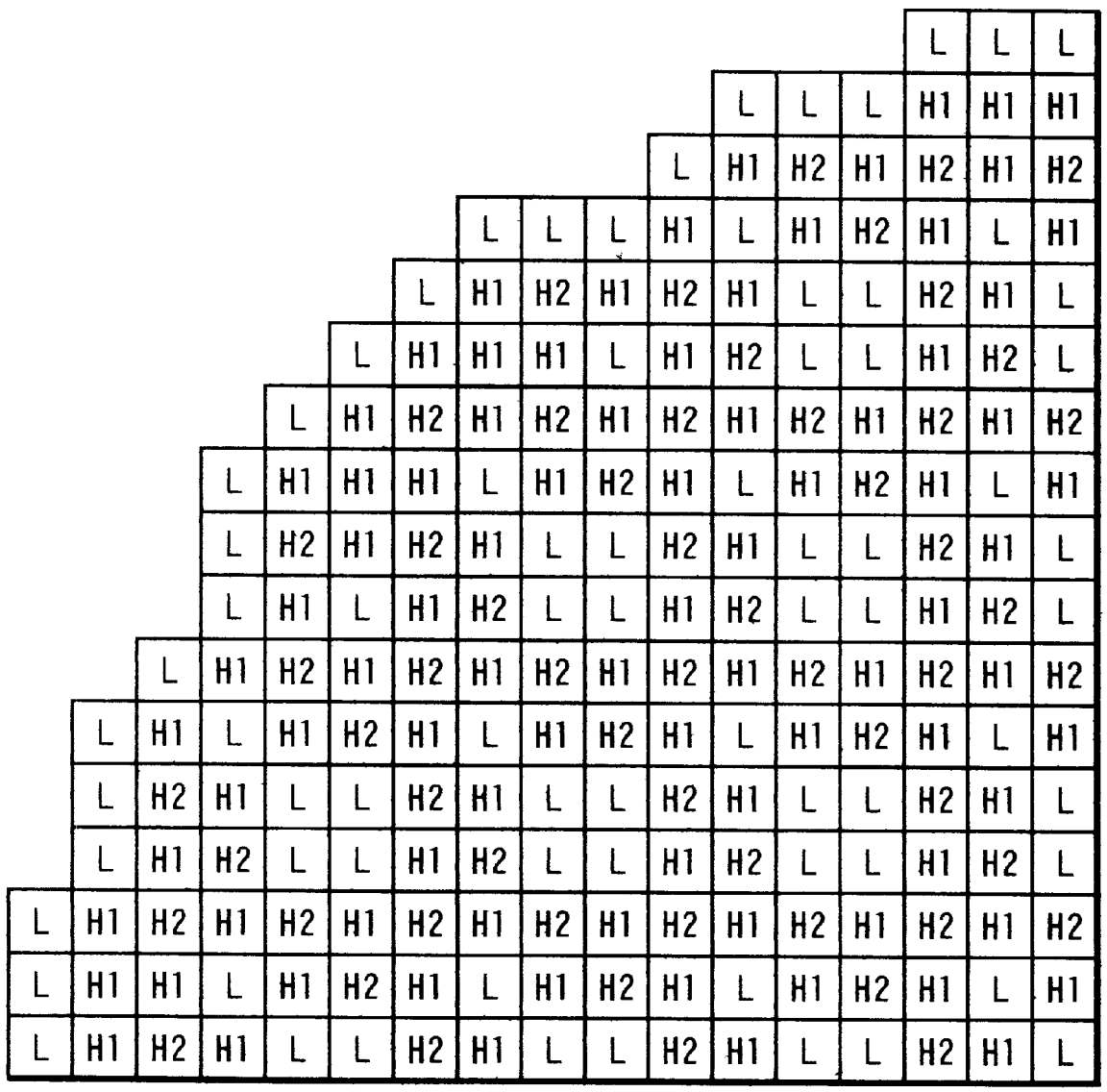
 LOW ENRICHMENT FUEL : 300 ASSEMBLIES
 HIGH ENRICHMENT FUEL (LOW Gd) : 344 ASSEMBLIES
 HIGH ENRICHMENT FUEL (HIGH Gd) : 228 ASSEMBLIES

INITIAL CORE

BACKGROUND OF THE INVENTION

This invention is related to an initial core loaded before operation of a nuclear reactor. A nuclear reactor requires continuous operation for a fixed period without supplying fuel, and the core contains a larger quantity of fissionable materials than necessary to maintain the critical state of the nuclear reactor. Therefore, if there is no control material in the core, a critical excess in reactivity will result. This excessive in reactivity is called excess reactivity, and it is important to control the excess reactivity properly throughout the operation cycle. As a technique to do so, it is well known to mix a burnable poison in the fuel. The burnable poison is a neutron absorber that burns gradually during the operation cycle, and gadolinia is a typical known burnable poison.

Next, the suppression effect of the reactivity by the burnable poison will be explained by reference to FIG. 3. FIG. 3 shows a relation between the infinite multiplication factor of a fuel assembly containing gadolinia as a kind of the burnable poison and the exposure. As is shown in FIG. 3, as the number of fuel rods with gadolinia (Gd fuel rods) is reduced, the infinite multiplication factor at the early stage of the exposure increases. On the other hand, if the density of gadolinia (density of Gd) is increased, the maximum value of the infinite multiplication factor can be suppressed, because the time when the gadolinia will burn out can be delayed. Therefore, excess reactivity can be properly controlled by a selected combination of the density of the burnable poison and the number of the fuel rods with the burnable poison.

Next, the improvement of the fuel economy of the initial core will be explained. Parts of fuel assemblies loaded into the initial core are taken out after the first operation cycle (first cycle) and these are exchanged for reload fuel assemblies. The fuel assemblies taken out after the first cycle have a lower burnup and a lower generated energy than other fuel assemblies. Then, to efficiently utilize the fissionable materials, the formation of an initial core using a plurality of fuel assemblies that have a different uranium enrichment according to the duration of their use in the reactor is determined.

With regard to this initial core, a core, composed of high enrichment fuel assemblies with 3.4 wt % average enrichment, middle enrichment in the axial direction of fuel assemblies with 2.3 wt % in the axial direction of the fuel assemblies and low enrichment fuel assemblies with 1.1 wt % in the axial direction of fuel assemblies, has been described in Japanese Patent Laid-open print No. 5-249270. It is also described in this publication that fuel assemblies with lower average enrichment in the axial direction are taken out from the core in an earlier stage and other fuel assemblies with a higher average enrichment in the axial direction are loaded into the core for a long period to efficiently utilize the fissionable materials.

With regard to a known way of improving the fuel economy of the initial core, it has been described that fuel assemblies having a higher average enrichment than reload fuel assemblies are loaded in the most outer position of the core in Japanese Patent Laid-open print No. 60-13283.

Another known way to improve the fuel economy of the initial core is described in Japanese Patent Laid-open print No. 61-165682. In this publication, an increase of exposure which originated from the start-up test is compensated by increasing the number of the high enrichment fuel assemblies of the initial core to more than the number of reload fuel assemblies of the equilibrium core. As a result, the fuel economy of the initial core is improved. In this known arrangement, the enrichment of the high enrichment fuel assembly is the same as that of the reload fuel assembly.

The nuclear reactor requires operation with a proper control of the reactivity for a constant term. Generally, the increase of excess reactivity caused by increasing the average enrichment of the initial core in the axial direction is reduced by insertion of control rods or by mixing burnable poison into the fuel. But, in a core which is provided with an increased average enrichment in the axial direction for purposes of obtaining a higher burnup, the excess reactivity also increases further. When the control rods are inserted to reduce the increase of the excess reactivity, with an increase in the number of the inserted control rods, the channel peaking factor increases, and the thermal margin decreases. Moreover, it is also necessary to repeat an adjustment of the quantity of the control rods being inserted to compensate for a large change of the excess reactivity in the operation cycle. This reduces the availability factor of the nuclear reactor, and it is not desirable from the viewpoint of fuel economy. In case of increasing the mixing quantity (density) of the burnable poison, while the excess reactivity could be suppressed by increasing the mixing quantity (i.e. enrichment) of the burnable poison, this causes the thermal conductivity of the fuel pellets to decline, producing a problem from the integrity point of view.

As is mentioned above, an increase of the excess reactivity of the core was the main factor for a disturbance in case of achieving a high burnup of the initial core.

When the high burnup of the initial core is designed according to the technique described in Japanese Patent Laid-open print No. 60-13283, a sufficient effect is not achieved. In this case, because fuel assemblies with a high average enrichment in the axial direction are only loaded into the most outer position of the core, the number of the fuel assemblies with a high average enrichment in the axial direction is limited. Consequently, there is a limit to the improvement in the fuel economy to be obtained by increasing the average enrichment in the axial direction of the initial core.

Even if the technique described in Japanese Patent Laid-open print No. 61-165682 is used, a sufficient effect is not achieved. In this technology, because the number of the high enrichment fuel assemblies of the initial core is at most about 20–30% of the total number of the fuel assemblies, there is a limit to the increase of the average enrichment of the initial core. Consequently, the effect for fuel improvement is not sufficient.

SUMMARY OF THE INVENTION

An object of the present invention is to provide an initial core designed for high burnup that can properly control the excess reactivity and can improve the fuel economy, without increasing the density of the conventional burnable poison.

For the purpose of achieving the above object, in an initial core of the present invention, fuel assemblies having a higher average enrichment in the axial direction than reload fuel assemblies are loaded in an area other than the most outer position of the core. The most outer position of the core means a position where at least one side of the fuel assembly faces the outer area of the core, when the fuel assembly is loaded into position.

Preferably, the average enrichment in the axial direction of the fuel assemblies having higher average enrichment in the axial direction than reload fuel assemblies should be 4.0 wt % or more.

In accordance with the present invention, by taking into consideration the fact that a burnup of the burnable poison strongly depends on the neutron spectrum of the circumference of fuel assemblies containing the burnable poison, delay of the burnup of the burnable poison can be achieved. That is, the burnup of the burnable poison is delayed by making the average enrichment in the axial direction of the fuel assemblies loaded into the initial core higher than that of reload fuel assemblies. The thermal neutron absorption cross section of gadolinium (Gd), which is the representative example of the burnable poison, is as large as about 61,000 barns for $^{155}$Gd and about 240,000 barns for $^{157}$Gd. The burnup speed of Gd depends on the magnitude of this cross section. Because this cross section of higher energy neutrons is smaller than that of lower energy neutrons, the burnup of Gd in the area where high energy neutrons exist is delayed. That is, if the average energy of the neutrons in the area where the Gd burns is made high, the burnup of Gd can be delayed.

In a light water reactor, fast neutrons having an average energy of 2 MeV are produced by fission. These fast neutrons become thermal neutrons by mainly scattering with water, and the following fission is caused. Therefore, fission reactions should be increased by increasing the uranium enrichment of fuel assemblies to increase the average energy of neutrons in the nuclear reactor. A function that delays the burnup of the burnable poison by increasing the uranium enrichment of fuel assemblies will be explained by referring to FIG. 4

FIG. 4 shows a relationship between the exposure and the infinite multiplication factor in the perpendicular section to the axial direction of fuel assemblies containing the burnable poison. Both the present invention, (the average enrichment in the axial direction of the fuel assembly is 4.2 wt %) having 4.6 wt % average enrichment in the section perpendicular to the axial direction and a comparative example of 4.2 wt % (the average enrichment in the axial direction of the fuel assembly is 3.7 wt % equal to a typical reload fuel assembly) having 4.2 wt % average enrichment in the same section perpendicular to the axial direction are shown in FIG. 4. The density of the burnable poison of both are the same.

When the exposure increases, the infinite multiplication factor increases at first, becomes maximum, and then decreases. In this relationship, the time when the burnable poison burns out (burn-out time) is thought to correspond to an intersection point between an extended line of the first half part having a tendency to increase the infinite multiplication factor and another extended line of the latter half part having a tendency to decrease the factor. The burn-out time of the present invention and the comparative example are shown by point B and point A, respectively, in FIG. 4.

From FIG. 4, it can be seen that the burn-out time can be delayed for the term corresponding to the exposure of about 2 GWd/t by increasing the average enrichment in the section perpendicular to the axial direction by about 0.4 wt %. Therefore, even if the high burnup is designed by increasing the average enrichment in the axial direction of the initial core, the excess reactivity can be properly suppressed by composing the core using fuel assemblies having a higher average enrichment in the axial direction than the reload fuel assemblies.

Furthermore, in accordance with the present invention, the economy of the initial core can be improved by loading the fuel assemblies having a higher average enrichment in the axial direction than the reload fuel assemblies into an area other than the most outer position of the core. The reason why the fuel assemblies having a high average enrichment in the axial direction are not loaded into the most outer position is because it is useless from the point of view of fuel economy to load fuel assemblies capable of increasing the exposure into the most outer position where the exposure does not increase so much.

The reason why the average enrichment of fuel assemblies having a higher average enrichment in the axial direction than the reload fuel assemblies is made 4.0 wt % or more is because it achieves an equal effect to the case wherein the density of the gadolinia (gadolinium oxide) is increased by 1.0 wt % or more. The density of the gadolinia means the weight percent of the gadolinia in the fuel rod containing the gadolinia. The above function will be explained by using FIG. 11 as follows. FIG. 11 shows a relationship between the exposure for burning out the gadolinia and the average enrichment of the fuel assembly. From FIG. 11, it can be seen that, as the exposure for burning out the gadolinia is increased, the burnup of the gadolinia can be delayed by increasing the gadolinia density above conventional density. The maximum of the conventional gadolinia density is 7.5 wt % at present. The same effect also can be achieved by increasing the average enrichment of the fuel assembly. That is, as shown in FIG. 11, the same effect as increasing the gadolinia density 1 wt % is achieved by increasing the average enrichment in the axial direction of the fuel assembly from 3.7 wt % to 4.0 wt %. Consequently, the burnup of the gadolinia can be delayed, and the excess reactivity can be properly controlled without increasing the conventional gadolinia density by increasing the average enrichment in the axial direction of the fuel assembly to 4.0 wt % or more. The upper limit of the average enrichment in the axial direction of the fuel assembly is 4.9 wt %, which is the maximum at present.

BRIEF DESCRIPTION OF THE DRAWINGS

FIG. 1 is a diagram which shows a ¼ cross section of a first embodiment of an initial core according to the present invention.

FIG. 10 is a diagram which shows a ¼ cross section of a further arrangement of the initial core according to the present invention.

DETAILED DESCRIPTION OF THE PREFERRED EMBODIMENTS

Various embodiments according to the present invention will be explained by reference to the drawings.

Figure 2:
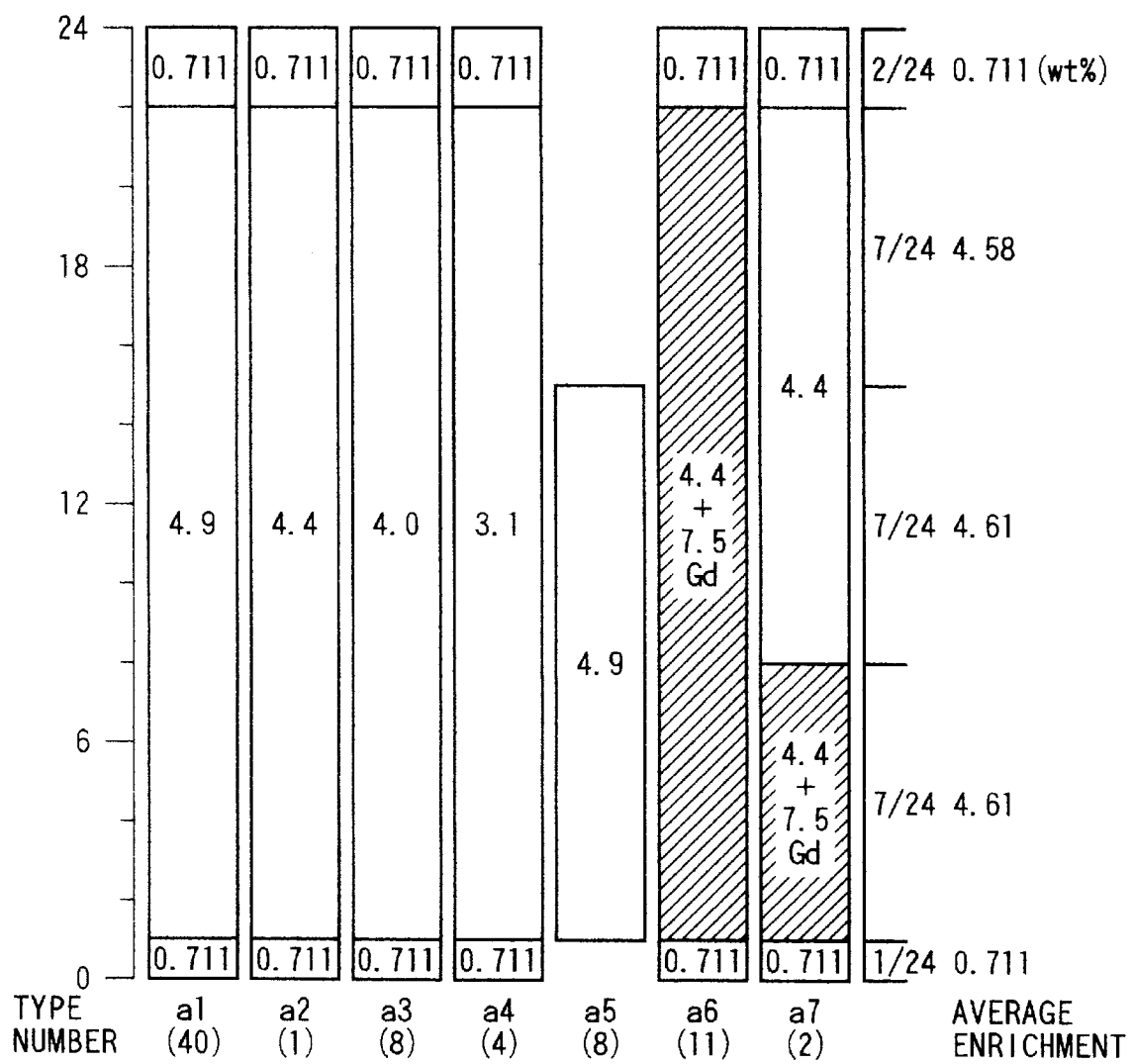
FIG. 2 is a graph which shows a structure of the fuel rods of the high enrichment fuel assembly of FIG. 1.
Figure 3:
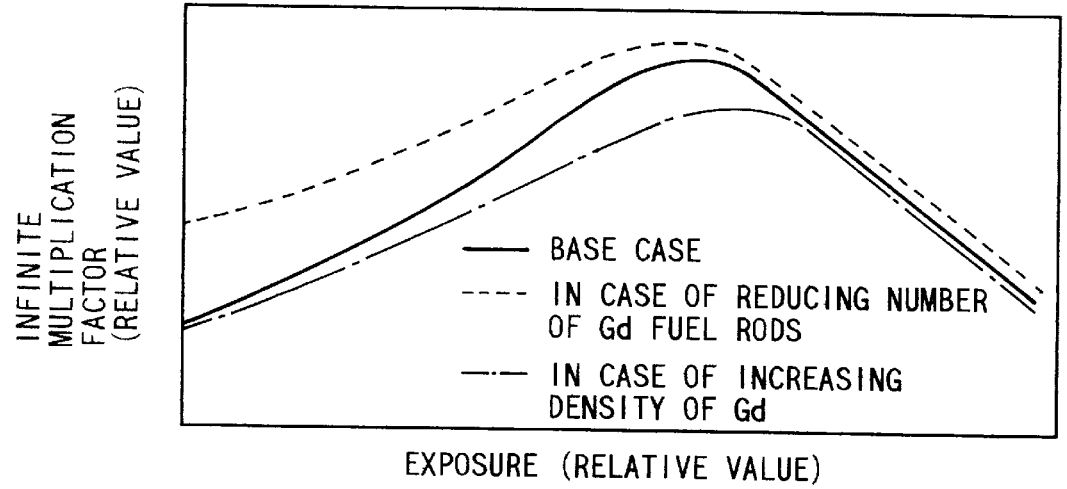
FIG. 3 is a graph which shows a relationship between the infinite multiplication factor of a fuel assembly containing a burnable poison and the exposure.
Figure 4:
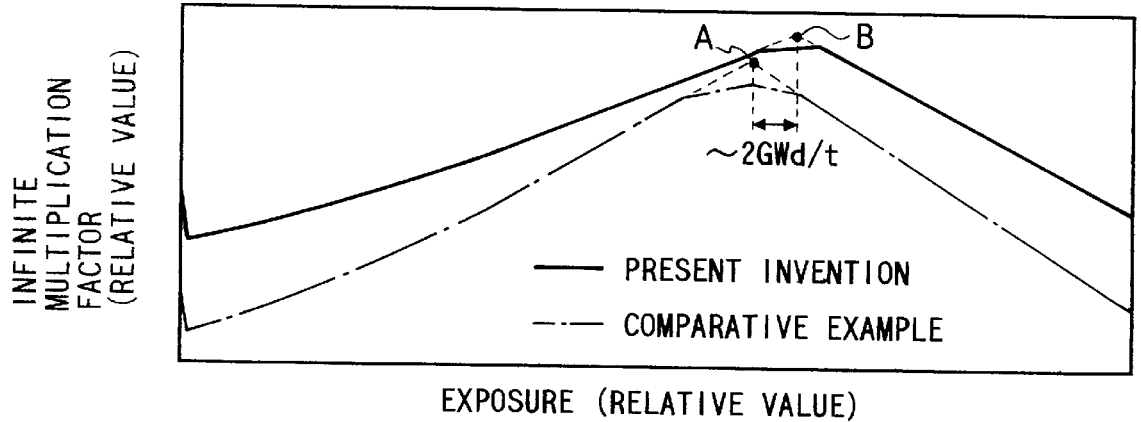
FIG. 4 is a graph which shows the function that delays the burnup of a burnable poison.

FIG. 1 shows a ¼ cross section of a first embodiment of an initial core according to the present invention. FIG. 2 shows a structure of the fuel rods of the high enrichment fuel assembly of FIG. 1. 572 high enrichment fuel assemblies (hereinafter indicated by high enrichment fuel) H with 4.2 wt % average enrichment in the axial direction and 300 low enrichment fuel assemblies (hereinafter indicated by low enrichment fuel) L with 1.5 wt % average enrichment in the axial direction are loaded into the core of FIG. 1. The average enrichment in the axial direction of the core is about 3.3 wt %. In this core, only low enrichment fuels are loaded into the most outer position and high enrichment fuels are loaded into areas other than the most outer position. In this embodiment, the average enrichment in the axial direction of reload fuel assemblies (hereinafter indicated by reload fuel) is 3.7 wt % which is a typical average enrichment. That is, the average enrichment in the axial direction of the high enrichment fuels is 0.5 wt % higher than that of the reload fuels.

The high enrichment fuel used for this embodiment is composed of fuel rods a1–a7 as shown in FIG. 2, and the number of each fuel rod is also shown in FIG. 2. Fuel rods a1–a4 contain uranium fuel and no gadolinia in the whole of the fuel effective length. Fuel rod a5 contains uranium fuel only in the range of $^{1}/_{24}$–$^{15}/_{24}$ from the bottom of the fuel effective length, and contains no gadolinia. Fuel rod a5 is hereinafter referred as a part length fuel rod. Fuel rod a6 contains uranium fuel in the whole of the fuel effective length, and gadolinia in the range of $^{1}/_{24}$–$^{22}/_{24}$ from the bottom of the fuel effective length. Fuel rod a7 contains uranium fuel in the whole of the fuel effective length and gadolinia in the range of $^{1}/_{24}$–$^{8}/_{24}$ from the bottom of the fuel effective length.

Fuel rods a1–a4, a6 and a7, contain natural uranium (uranium enrichment is 0.711 wt %) in the bottom end area of $^{0}/_{24}$–$^{1}/_{24}$ from the bottom of the fuel effective length and in the top end area of $^{0}/_{24}$–$^{2}/_{24}$ from the top of the fuel effective length. Fuel rod a6 contains uranium fuel with 4.4 wt % and gadolinia with 7.5 wt % in the range of $^{1}/_{24}$–$^{22}/_{24}$ from the bottom of the fuel effective length. Fuel rod a7 contains uranium fuel with 4.4 wt % and gadolinia with 7.5 wt % in the range of $^{1}/_{24}$–$^{8}/_{24}$ from the bottom of the fuel effective length, and only uranium fuel with 4.4 wt % in the range of $^{8}/_{24}$–$^{22}/_{24}$ from the bottom of the fuel effective length. Fuel rod a5 contains uranium fuel with 4.9 wt % in the whole of the part length fuel rod.

The low enrichment fuel contains no gadolinia, and the average enrichments in the section perpendicular to the axial direction in the area of $^{1}/_{24}$–$^{8}/_{24}$, $^{8}/_{24}$–$^{15}/_{24}$ and $^{15}/_{24}$–$^{22}/_{24}$ from the bottom of the fuel effective length are 1.49, 1.64 and 1.75 wt % respectively. Natural uranium is loaded into the top end area and the bottom end area of the fuel effective length like the high enrichment fuel.

The fuel assembly of FIG. 2 is composed of these fuel rods so as to make the average enrichments in the section perpendicular to the axial direction in the area of $^{1}/_{24}$–$^{15}/_{24}$ and $^{15}/_{24}$–$^{22}/_{24}$ from the bottom of the fuel effective length 4.61 and 4.58 wt % respectively.

Figure 5:
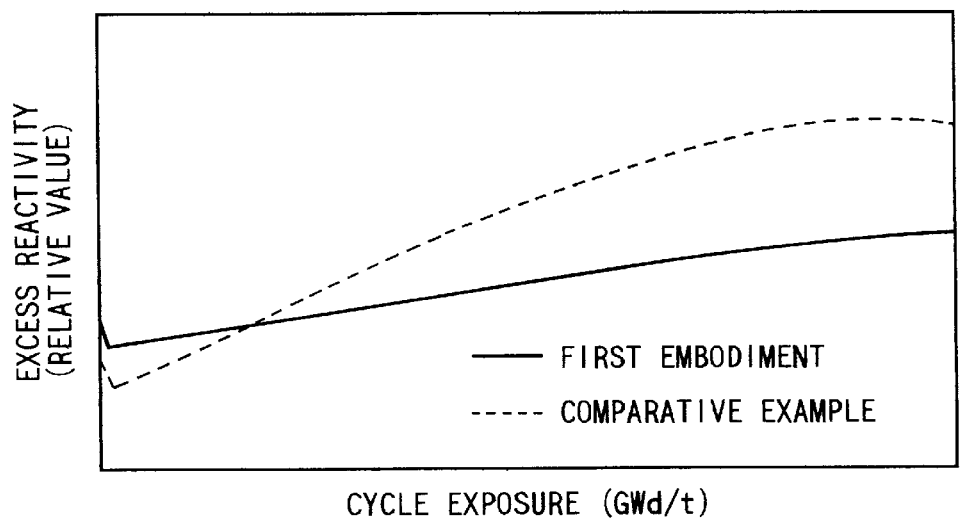
FIG. 5 is a graph which shows a relationship between the excess reactivity and the cycle exposure of the initial core shown in FIG. 1.

FIG. 5 shows a relationship between the excess reactivity and the cycle exposure of the initial core shown in FIG. 1. The cycle exposure indicates an increased quantity of the average exposure of the core during one operation cycle. FIG. 5 shows the first embodiment shown in FIG. 1 and a comparative example. In the high enrichment fuel of the comparative example of FIG. 5, the average enrichments in the section perpendicular to the axial direction in the area of $^{1}/_{24}$–$^{8}/_{24}$, $^{8}/_{24}$–$^{15}/_{24}$ and $^{15}/_{24}$–$^{22}/_{24}$ from the bottom of the fuel effective length are 4.04, 4.20, and 4.18 wt %, respectively. The average enrichment of the high enrichment fuel of this comparative example is 3.7 wt % equal to the reload fuel. From FIG. 5, it is seen that this embodiment of the present invention can suppress the excess reactivity of the core more effectively than the comparative example.

Figure 6:
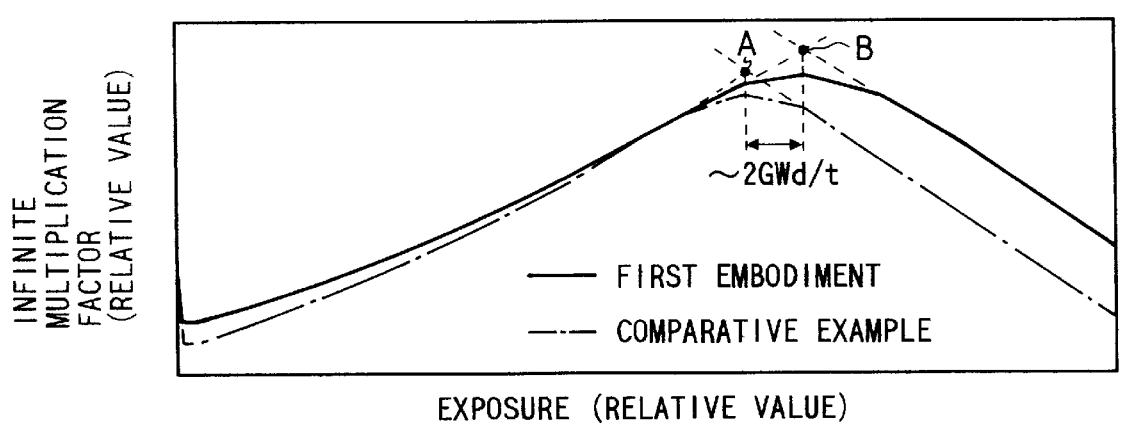
FIG. 6 is a graph which shows a relationship between the exposure and the infinite multiplication factor of the high enrichment fuel assembly of the first embodiment.

FIG. 6 shows a relationship between the exposure and the infinite multiplication factor of high enrichment fuel of the first embodiment. The first embodiment and the comparative example of which the average enrichment in the axial direction of the fuel assembly is 3.7% are shown in FIG. 6. From FIG. 6, the burnup of the gadolinia can be delayed about 2 GWd/t by increasing the average enrichment in the axial direction of the fuel assemblies by about 0.4 wt %. In this embodiment, the high enrichment fuel contains part length fuel rods. But, even if the high enrichment fuel contains no part length fuel rod, the same effect can be achieved by increasing the average enrichment in the axial direction of the fuel assembly to a value higher than that of the reload fuel.

Figure 9:
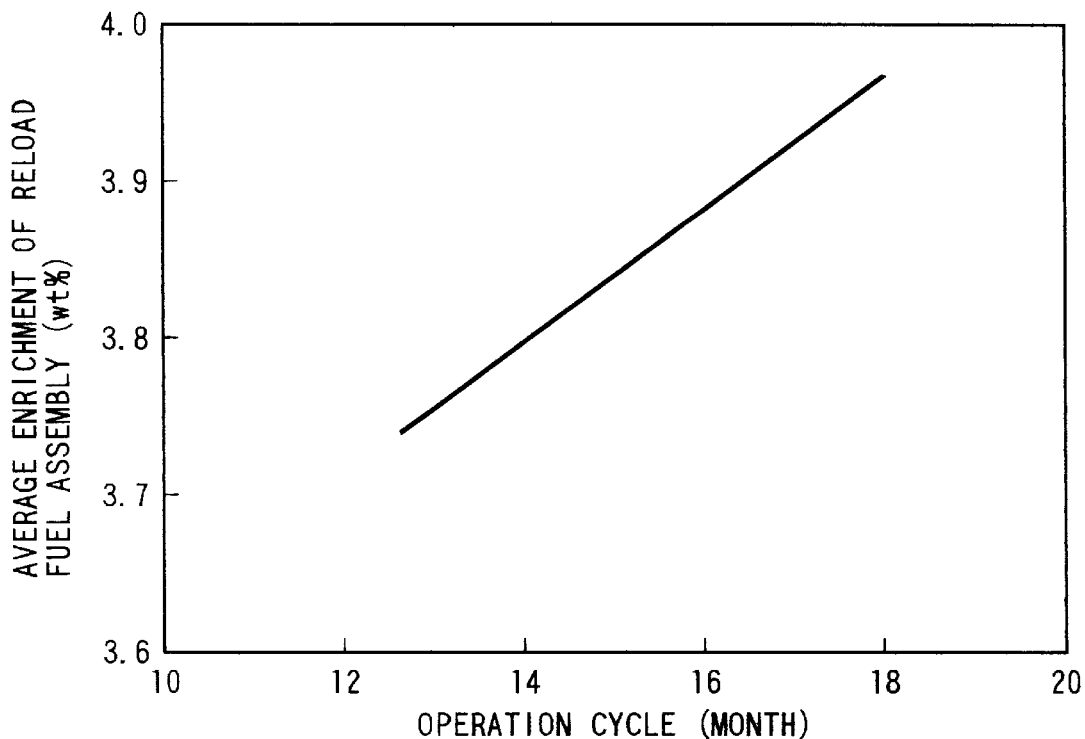
FIG. 9 is a graph which shows a relationship between the average enrichment of a reload fuel assembly and an operation cycle.
Figure 11:
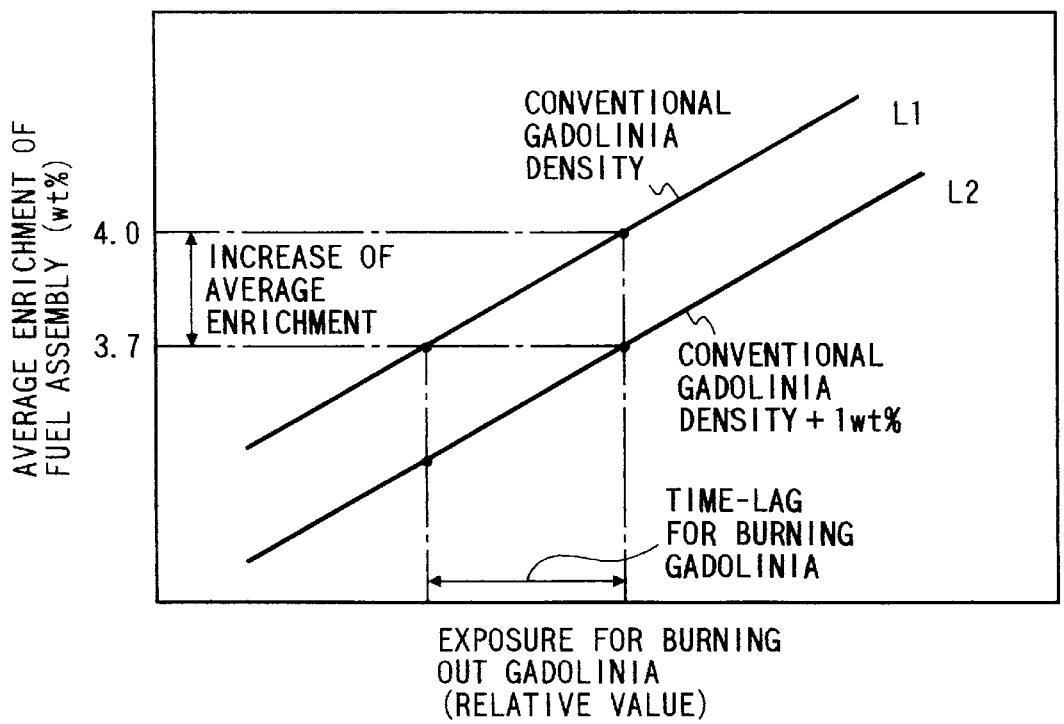
FIG. 11 is a graph which shows a relationship between the exposure for burning out gadolinia and the average enrichment of the fuel assembly.

The average enrichment in the axial direction of the reload fuel is determined by the core size, the lattice structure, the operation cycle and so on. In this embodiment, the average enrichment in the axial direction of the reload fuel is set to about 3.7 wt % for the condition of an electric power of 1,350,000 kW and an operation cycle of 13 months. FIG. 9 shows a relationship between the average enrichment in the axial direction of the typical reload fuel and the operation cycle.

From FIG. 9, it is seen that the excess reactivity can be properly controlled and the economy of fuel can be improved without increasing the density of the conventional burnable poison by setting up the proper average enrichment of the reload fuel according to the operation cycle, by increasing the average enrichment of the high enrichment fuel to a value higher than that of the reload fuel, and by loading the high enrichment fuel into an area other than the most outer position of the core.

Figure 7:
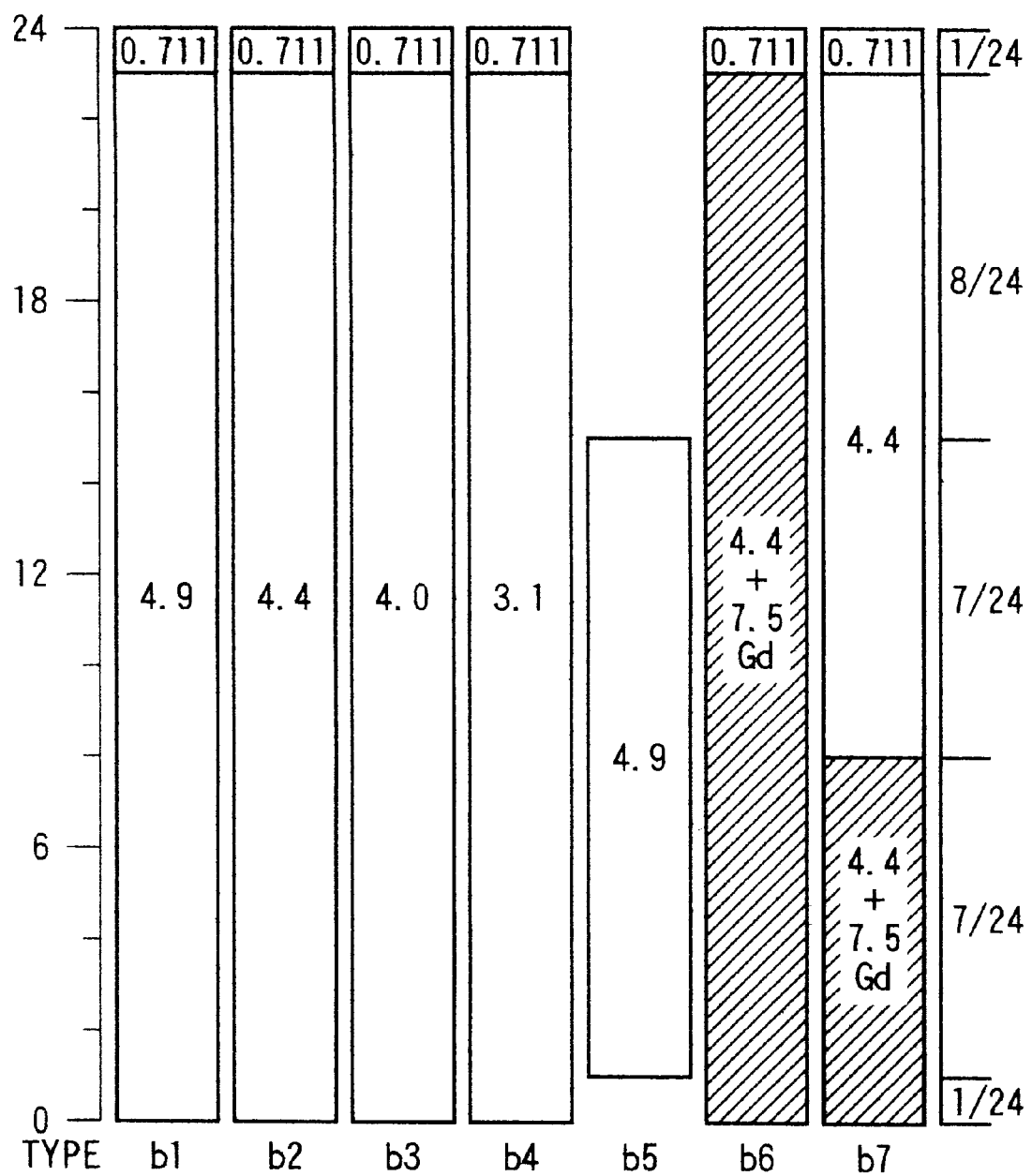
FIG. 7 is a diagram which shows the second embodiment of the high enrichment fuel assembly according to the present invention.

Next, a second embodiment of the high enrichment fuel according to the present invention will be explained with reference to FIG. 7. In the high enrichment fuel of the first embodiment shown in FIG. 2, natural uranium was loaded into both of the top end area and the bottom end area. In this embodiment, in contrast to the first embodiment, natural uranium is loaded into only the top end area of $^{0}/_{24}$–$^{1}/_{24}$ from the top of the fuel effective length. That is, in this example, enriched uranium and natural uranium are loaded into the area $^{0}/_{24}$–$^{23}/_{24}$ and $^{23}/_{24}$–$^{24}/_{24}$ respectively from the bottom of the fuel effective length. Hereinafter the area loaded with enriched uranium will be referred to as an enriched uranium area. The number of each fuel rod (b1–b7), the gadolinia density and so on are the same as in FIG. 2.

When the high enrichment fuels of this embodiment are loaded into the core of FIG. 1, the average enrichment in the axial direction of the core increases by about 0.1 wt % by the expansion of the enriched uranium area in the axial direction. However, because of the enrichment of both end areas, where the neutron importance is small, is increased, the reactivity is not changed so much.

According to this embodiment, because the effective axial length of the core becomes longer by the expansion of the enriched uranium area in the axial direction, an axial peaking factor (a ratio of the maximum value and the average value of axial power) can be reduced by about 6%. Therefore, in addition to the effect of the first embodiment, the linear power heat generating ratio of the core can be reduced. As a result, the thermal margin is increased and the flexibility of the operation is improved.

Figure 8:
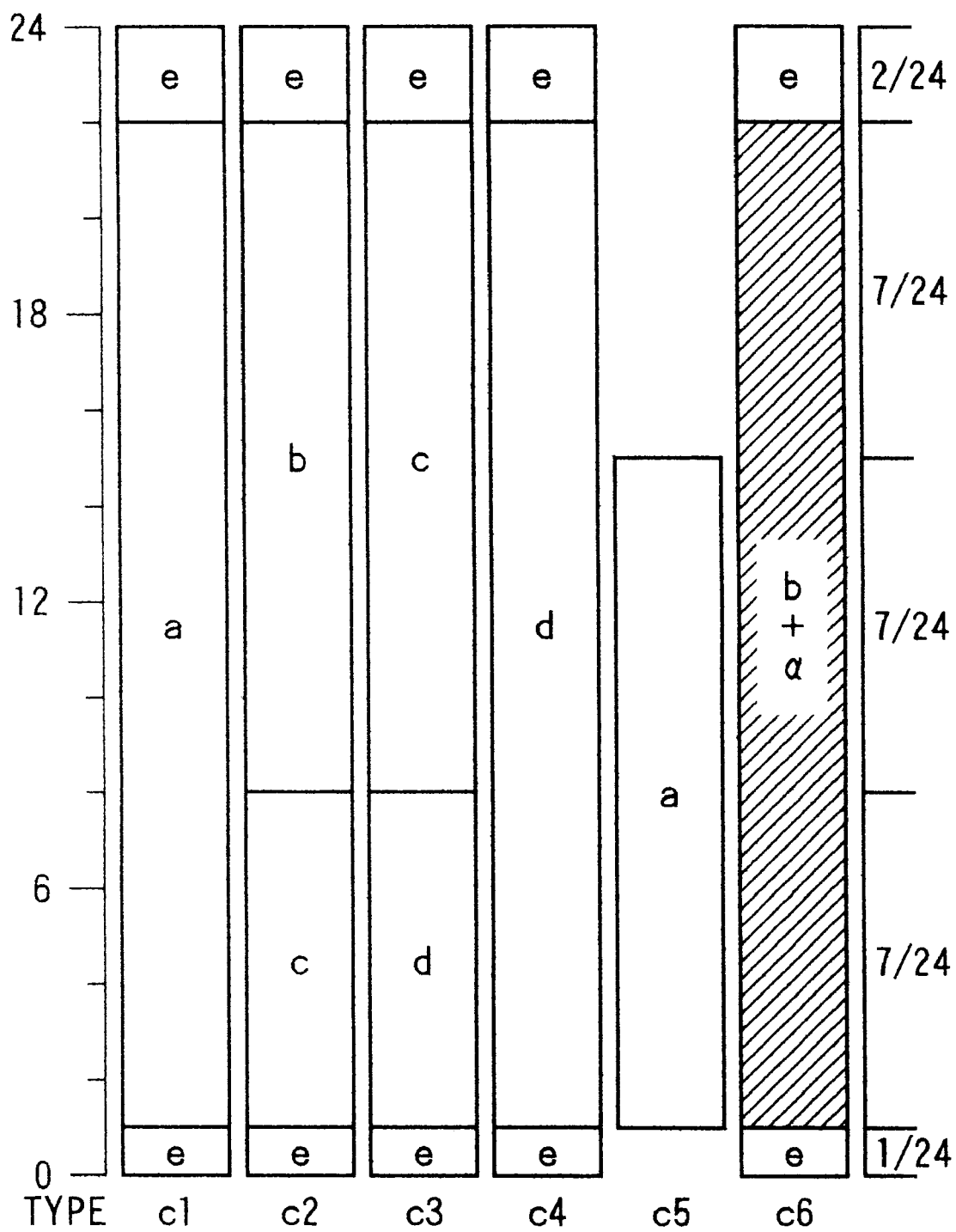
FIG. 8 is a diagram which shows the third embodiment of the high enrichment fuel assembly according to the present invention.

Next, a third embodiment of the high enrichment fuel according to the present invention will be explained with reference to FIG. 8. In the high enrichment fuel of the first embodiment shown in FIG. 2, both the fuel rod a6 containing gadolinia in the whole of the enriched uranium area and the fuel rod a7 containing gadolinia in a part of the enriched uranium area were loaded. In this embodiment, only fuel rod c6 containing gadolinia in the whole of the enriched uranium area is loaded. Each enriched uranium area of fuel rods c2 and c3 is divided in the position of $8/24$ from the bottom of the fuel effective length as a boundary, and the average enrichment in the section perpendicular to the axial direction of the upper part over the boundary is higher than that of the lower part under the boundary. In FIG. 8, the signs a–e denote the enrichment of uranium fuel and the sign $\alpha$ denotes the density of gadolinia. The relationship among magnitudes of the signs a–e is a>b>c>d>e. The sign e corresponds to 0.711 wt % of natural uranium. The magnitude of the sign a is 7.5 wt % or less.

In a boiling water reactor, voids are distributed in the axial direction by a boiling of the cooling water inside the core. Therefore, the higher the position is, the higher will be the ratio of the void (void fraction). In a light water reactor, because the fission reactions are suppressed on the condition of a little quantity of cooling water, the power distribution in the axial direction usually has a swollen lower part. Accordingly, in this embodiment, the power distribution in the axial direction can be flattened in addition to the effect of the first embodiment, by increasing the average enrichment (i.e. the average enrichment in the section perpendicular to the axial direction) of the upper part in the axial direction of the high enrichment fuel to a value higher than that of the lower part against the above power distribution. As a result, because the axial-peaking factor in the core can tee reduced, the thermal margin is increased and the flexibility of the operation is improved.

As for the enrichment of uranium fuel indicated by the signs a–e in FIG. 8, it is a necessary condition that the average enrichment in the axial direction of a fuel assembly is higher than that of the reload fuel. In the range of this condition, it is necessary to adjust the enrichment of fuel rods arranged in the most outer region or corner of the fuel assembly so that the power of the fuel rods does not become so high. In the case wherein a difference of enrichment is provided between the upper and lower parts in the axial direction, it is necessary to adjust the difference of enrichment to make the power distribution in the axial direction as flat as possible when the fuel assemblies are loaded into the core.

Lastly, a further arrangement of the initial core according to the present invention will be explained with reference to FIG. 10. FIG. 10 shows a ¼ cross section of the initial core. In this arrangement, while the number and the loading position of the low enrichment fuels L with 1.5 wt % average enrichment in the axial direction are the same as the arrangement of FIG. 1, the high enrichment fuels with 4.2 wt % average enrichment in the axial direction are different from the first arrangement. That is, the core is loaded with 344 high enrichment fuels H1 that have a lower number of fuel rods containing gadolinia (indicated by low Gd) and with 228 high enrichment fuels H2 that have higher number of fuel rods containing gadolinia (indicated by high Gd).

Because the power of the core can be suppressed by degrees by loading the fuel assemblies that have different number of fuel rods containing gadolinia into the core like this arrangement, the channel peaking factor can be flattened. Furthermore, because the power of the outer region of the core can be increased by loading the high enrichment fuel (low Gd) into the outer region, the channel peaking factor can be flattened more effectively.

What is claimed is:

1. A fuel loading method for initially loading at least two types of fuel assemblies which contain nuclear fuel materials and have different average enrichments in the axial direction of the fuel assemblies into a core, comprising the steps of:

loading initially first fuel assemblies having a relatively low average enrichment in the axial direction of the first fuel assemblies into the most outer position of the core and initially loading second fuel assemblies having a relatively high average enrichment in a range of 4.0 wt % or more in the axial direction of the second fuel assemblies into an area other than the most outer position of the core; and after at least a first operation cycle, exchanging at least a portion of the initially loaded second fuel assemblies for reload fuel assemblies having an average enrichment in the axial direction of the reload fuel assemblies which is higher than that of the first fuel assemblies and lower than 4.0 wt %.

2. A fuel loading method according to claim 1, wherein the average enrichment in the axial direction of the reload fuel assemblies is about 3.7 wt %.

3. A fuel loading method according to claim 1, wherein the initially loaded first and second fuel assemblies contain a natural uranium area having a length of at least $1/24$ of fuel effective length at both ends or one end in an axial direction.

4. A fuel loading method according to claim 3, wherein the initially loaded second fuel assemblies are divided into an upper part and a lower part excluding the natural uranium area, where each average enrichment in a section perpendicular to an axial direction is different, and a boundary between the upper part and the lower part is in a range of $8/24$–$15/24$ of fuel effective length.

5. A fuel loading method according to claim 1, wherein at least one of the second fuel assemblies contains at least two kinds of fuel rods which have different fuel effective lengths.

6. A fuel loading method according to claim 1, wherein the average enrichment in the axial direction of the first fuel assemblies is less than about 3.7 wt %.

7. A fuel loading method according to claim 6, wherein the average enrichment in the axial direction of the first fuel assemblies is about 1.5 wt %.

* * * * *